US008694014B1

(12) United States Patent
Singh et al.

(10) Patent No.: US 8,694,014 B1
(45) Date of Patent: Apr. 8, 2014

(54) OVERRIDING A CHANNEL LIST MESSAGE HASHING PROCESS

(75) Inventors: Jasinder P. Singh, Olathe, KS (US); Sachin R. Vargantwar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 226 days.

(21) Appl. No.: 13/021,831

(22) Filed: Feb. 7, 2011

(51) Int. Cl.
*H04W 72/00* (2009.01)

(52) U.S. Cl.
USPC ....... 455/452.1; 455/62; 455/432.3; 455/434; 455/453; 370/329; 370/312; 370/342

(58) Field of Classification Search
USPC ................. 455/432.3, 4.34, 452.1, 453, 62; 370/312, 329, 342
See application file for complete search history.

(56) References Cited

U.S. PATENT DOCUMENTS

| 6,970,719 | B1 | 11/2005 | McConnell |
| 2001/0048674 | A1 | 12/2001 | Cho |
| 2002/0082010 | A1 | 6/2002 | Koorapaty |
| 2003/0134655 | A1 | 7/2003 | Chen |
| 2004/0057413 | A1* | 3/2004 | An et al. .................. 370/342 |
| 2004/0266445 | A1 | 12/2004 | Burgess |
| 2008/0076436 | A1 | 3/2008 | Sanders |
| 2009/0215452 | A1 | 8/2009 | Balasubramanian |

* cited by examiner

*Primary Examiner* — Ajit Patel
*Assistant Examiner* — Julio Perez

(57) ABSTRACT

A method and corresponding system is provided for managing registrations and reducing registration failure. According to at least one embodiment of the method, a wireless communication device (WCD) receives a channel list message (CLM) in a given coverage area. The WCD may determine that it is not within coverage of a first channel specified in the CLM. The WCD may make this determination before attempting to register for service on the first channel. In response to making this determination, the WCD may register for service on another channel specified in the received CLM.

26 Claims, 6 Drawing Sheets

OVERRIDING A CHANNEL LIST MESSAGE HASHING PROCESS

BACKGROUND

In typical cellular wireless communication systems, wireless communication devices (WCDs) (e.g., cell phones, personal digital assistants, laptops, netbooks, tablets, and/or other wirelessly equipped devices) subscribe to service from a given cellular wireless service provider. In practice, a service provider will operate one or more networks (sometimes referred to as radio access networks (RANs)) including base transceiver stations (BTSs) that radiate to define wireless coverage areas where the subscriber WCDs can operate.

Through each BTS (and corresponding RAN), a WCD can obtain connectivity to other networks such as the public switched telephone network (PTSN) and the Internet. Further, each RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a WCD that is positioned within coverage of the RAN can then communicate with a BTS and in turn, via the BTS, with other served WCDs or with other entities on the transport network.

When a subscriber WCD enters into a coverage area of its service provider, the subscriber WCD may register with the service provider (through a BTS, for instance) and may then engage in wireless communication service via the service provider's network.

Generally, a BTS serving a particular coverage area will operate on a given carrier frequency, or more particularly a given band of frequencies (also referred to as a channel), and communicate with WCDs being served in the particular coverage area on the channel. By way of example, a channel can be defined as a specific frequency block, such as a 1.25 MHz block or a 5 MHz block in a profile frequency band used by the wireless service provider, such as 800 MHz (cellular band), 1.9 GHz (PCS band), or 2.5 GHz (BRS/EBS band). For instance, if a wireless service provider operates in the 800 MHz cellular band, coverage areas of the wireless service provider's RAN will typically operate with channels defined near 800 MHz. And if a wireless service provider operates in the 1.9 GHz band, coverage areas of the wireless service provider's RAN will typically operate with channels defined near 1.9 GHz. In practice, each channel may actually be defined as one frequency block for "forward link" communications from the RAN to WCDs and a corresponding but separate frequency block for "reverse link" communications from WCDs to the RAN.

In a coverage area where wireless communication traffic is particularly high, a BTS serving that coverage area may operate on more than one channel for communicating with the WCDs in that coverage area. The number of channels employed in a given coverage area may depend on various factors, such as the volume of communication traffic expected. For example, in a congested urban location, coverage areas might be designed to employ two or more channels, whereas in a sparsely populated rural location, coverage areas might employ only one channel.

In practice, a RAN may broadcast in each coverage area at least one channel list message (CLM) that specifies channels available for use in the coverage area, so that WCDs in the coverage area can determine which channel to use. If multiple channels are listed, then each WCD receiving the CLM may execute a hashing algorithm to determine which channel to register on in the coverage area. The process of determining a particular channel to use based on a hashing algorithm is referred to as "hashing," and the particular channel that is determined based on the hashing is referred to as the "hashed channel." If a WCD is under the coverage of two or more neighboring coverage areas, the WCD may receive a respective CLM from each coverage area.

Overview

Typically, when a WCD determines which particular channel to use in a given coverage area (e.g., by executing a hashing algorithm), the WCD may transmit a registration attempt to the serving BTS on that particular channel. A registration attempt may comprise one or more messages indicating that the WCD is attempting to receive service from the serving BTS in the coverage area. When the WCD sends a registration attempt, the BTS may receive the registration attempt and consequently register the WCD for service in the given coverage area. Registering a WCD for service may comprise updating one or more location databases (e.g., a Home Location Register (HLR), a Visitor Location register (VLR), or some other database) with information indicating the coverage area the WCD is located in and channel the WCD is using. The serving BTS may also transmit to the registering WCD a registration response message of some kind.

Once a WCD is registered for service on one of the channels in a given coverage area, the WCD may operate on that channel in what is known as an "idle" mode. The process of operating in an idle mode is sometimes referred to as "idling." Thus, if a WCD is registered for service on channel F1 in a given coverage area, and the WCD is operating in an idle mode, the WCD is said to be idling on channel F1. In a typical idle mode, the WCD may periodically scan air interface control sub-channels of the coverage area in order to receive any relevant page messages from the serving BTS. Further, if the WCD seeks to originate (initiate) a communication session (e.g., a voice call or data session), the WCD would do so on the channel on which it is idling. When a WCD is engaged in a communication session with a BTS, the WCD is said to be operating in an "active" state.

Unfortunately, sometimes a WCD's registration attempt may be unsuccessful. That is, the WCD's registration attempt may result in a failure to register for service. One reason for this failure may be that when the WCD transmits a registration attempt, the WCD may be too far away from the serving BTS for the BTS to receive the registration attempt on the hashed channel. In this situation, the WCD is said to be outside the "footprint" of its hashed channel. This situation can arise when a WCD is located at the edge of a coverage area. For instance, at an edge of a given coverage area, the WCD may detect a pilot signal on channel F1 and receive on channel F1 a CLM. The CLM may specify that in the given coverage area channels F1 and F2 are available for service. Through a channel selection process (e.g., a hashing algorithm), the WCD may select channel F2 to operate on and may consequently transmit to the BTS a registration attempt on channel F2. However, channel F2 may have weaker propagation than that of channel F1 and, consequently, channel F2 may not extend to cover the current location of the WCD. As a result, the BTS may not receive the WCD's registration attempt on channel F2 and therefore may not register the WCD for service.

Another reason may be that the serving BTS may receive the WCD's registration attempt correctly but may be unable to register the WCD because the coverage area is too congested. For instance, the serving BTS may determine that the number of WCDs registered on the WCD's hashed channel has reached a threshold level and therefore the BTS may not register the WCD for service on the hashed channel. Still another reason may be that the serving BTS may receive the registration attempt with one or more errors. For instance, if the registration attempt is received erroneously, the BTS may not be able to determine which WCD transmitted the registration attempt and therefore the BTS may not register the WCD for service. Other reasons may also exist for a WCD's registration attempt resulting in a failure to register for service.

One method for managing this registration failure involves the WCD waiting for a finite period of time (e.g., one second) and transmitting another registration attempt. In some situations, the WCD may be able to successfully register after the transmission of relatively few additional registration attempts. For instance, where the BTS received a WCD's registration attempt with errors, a few (e.g., one or two) additional registration attempts may result in a successful registration. However, in other situations, the WCD may not be able to register even after transmitting several additional registration attempts. For instance, where the WCD is located outside the footprint of its hashed channel, the WCD may transmit several (e.g., 10 or more) additional registration attempts and still may not successfully register. Transmitting several additional registration attempts may result in a poor user experience because it may lead to a significant time delay before registering and may consume considerable battery power.

Disclosed herein is an improved method for managing registrations and reducing registration failure. In accordance with the method, a WCD may receive in a given coverage area a CLM specifying a plurality of channels that the RAN operates on in the given coverage area. The WCD may determine that the WCD is not within coverage of a first channel specified in the CLM. In response to the determining, the WCD may register for service on a second different channel specified in the CLM.

In one embodiment of the method, the WCD may determine that the WCD is not within coverage of a first channel before the WCD transmits any registration attempt on the first channel. For example, after receiving the CLM in the given coverage area and learning which channels the given coverage area operates on, the WCD may scan for coverage of a first channel specified in the CLM. If the WCD does not detect a signal on the first channel (e.g., detects an absence of a signal on the first channel), the WCD may not transmit a registration attempt on the first channel. Instead, the WCD may transmit a registration attempt on a second channel specified in the CLM. Through this process, the WCD may avoid a failed registration attempt and therefore may avoid wasted time and battery power.

The WCD may, in response to receiving the CLM, execute a channel selection process (e.g., a hashing algorithm) and thereby select the first channel as the WCD's hashed channel. Prior to registering for service on the first channel, the WCD may then scan for coverage on the first channel to determine whether the WCD is within coverage of the first channel. Alternatively, after receiving the CLM but prior to executing a hashing algorithm, the WCD may scan for coverage of each channel specified by the CLM. By scanning for coverage of each specified channel, the WCD may determine which channels cover the WCD and which channels do not cover the WCD. The WCD may then execute a hashing algorithm with respect to just the channels that cover the WCD and thereby select one of the channels that cover the WCD as the WCD's hashed channel. The WCD may then transmit a registration attempt on its hashed channel.

In another embodiment of the method, after transmitting a registration attempt on the first channel the WCD may determine that the WCD is not within coverage of a first channel. For example, after receiving the CLM in the given coverage area and learning which channels the given coverage area operates on, the WCD may transmit a registration attempt on a first channel specified in the CLM. If the WCD ultimately fails to register for service on the first channel, the WCD may treat such failure as an indication that the WCD is not within coverage of the first channel. In response to the WCD failing to register for service on the first channel, the WCD may transmit a registration attempt on a second channel specified in the CLM and may ultimately register for service on the second channel.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Figure 1:
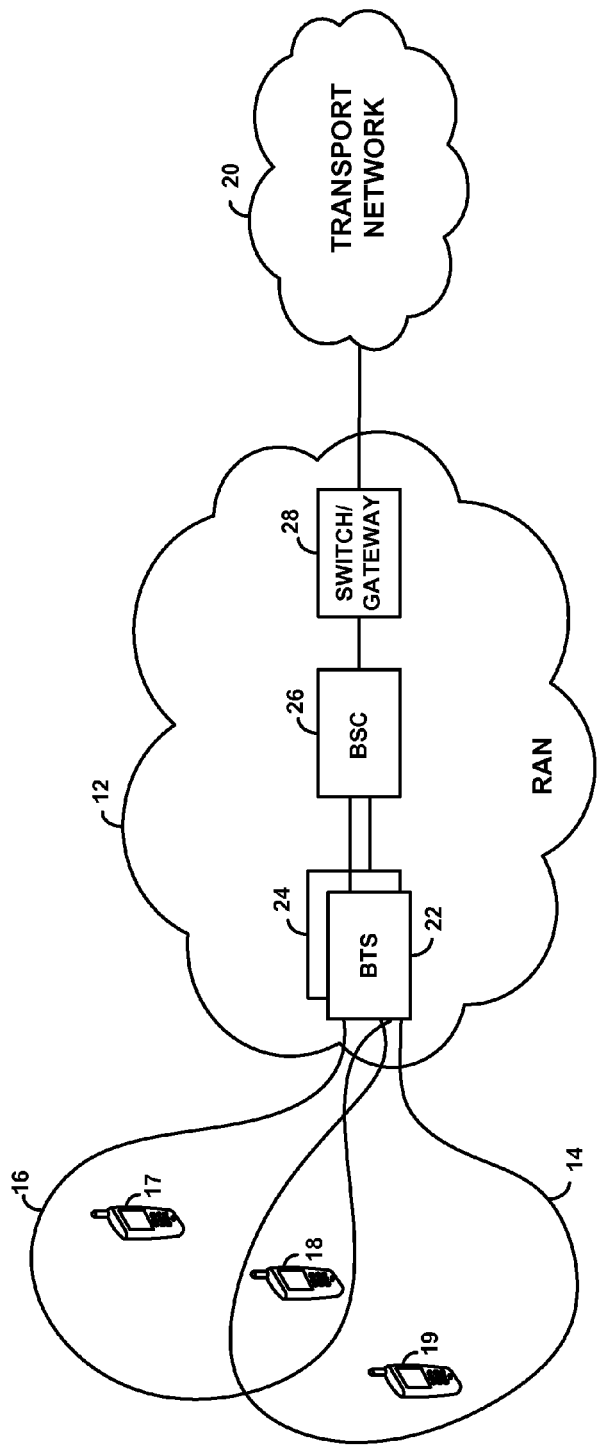
FIG. 1 depicts an example communication system in which the present method can be implemented.

Referring to the drawings, FIG. 1 is a simplified block diagram of a communications network in which at least one embodiment of the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another such non-transitory machine-readable medium.

As shown in FIG. 1, the exemplary network includes at its core a radio access network (RAN) 12 that radiates to define a plurality of wireless coverage areas, including representative coverage areas 14 and 16. Shown operating in the various coverage areas by way of example are wireless communication devices (WCDs) 17, 18, 19, which communicate over the air with the RAN 12. A WCD, such as WCD 18, may be under the coverage of both coverage areas 14 and 16. In practice, RAN 12 may also be coupled with one or more transport networks, such as representative network 20. With this arrangement, each served WCD can engage in wireless communication with the RAN and may thereby communicate with other entities, such as other WCDs served by the RAN or with entities on transport network 20. Other RANs (not shown) may exist as well.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network, or merely provides connectivity between WCDs.

At a more complex level (as shown), but still by way of example, the RAN may be a cellular radio access network. As shown, such a network may have a plurality of base transceiver stations (BTSs) (or more generally "base stations"), including representative BTSs 22 and 24, each of which provides antenna elements that radiate to define a respective coverage area and perhaps a set of coverage areas. In that arrangement, each of the coverage areas 14 and 16 may comprise one or more cells and/or cell sectors for instance. In one example, coverage area 14 may correspond to an area defined by a radiation pattern of BTS 22, while coverage area 16 may correspond to an area defined by a radiation pattern of BTS 24. In another example, coverage areas 14 and 16 may each correspond to areas defined by radiation patterns of the same BTS (e.g., BTS 22). The BTSs are in turn shown coupled with a base station controller (BSC) 26, which is then coupled with a switch or gateway 28 that provides connectivity with transport network 20.

In some systems, BSC 26 may manage various aspects of air-interface operation, such as handoffs between BTSs or the like. The BSC may be integrated with a BTS to cooperatively define a "base station," or either component may be considered to provide "base station" functionality. Further, in some systems, similar functionality can be provided by a radio network controller (RNC) or other such component.

Switch/gateway 28 may manage functions such as handoffs between BSC governed coverage areas or the like. Further, as noted above, the switch/gateway may provide connectivity with a transport network. For instance, a switch such as a mobile switching center (MSC) or media gateway may provide connectivity with the PSTN, and a gateway such as a packet data serving node (PDSN) may provide connectivity with a packet-switched network such as the Internet.

RAN 12 may operate according to IS-95, iDEN, CDMA, EV-DO, iDEN, TDMA, AMPS, GSM, GPRS, MMDS, UMTS, EDGE, WiMAX (e.g., IEEE 802.16), LTE, microwave, satellite, Wi-Fi (e.g., IEEE 802.11), Bluetooth, and/or any other wireless protocol or protocols now known or later developed.

An air interface protocol will generally define a "forward link" encompassing communications from the BTS to active WCDs and a "reverse link" encompassing communications from active WCDs to the BTS. Further, each of these links may be structured such that multiple WCDs can simultaneously communicate with the serving BTS, through use of time division multiplexing, code division multiplexing (e.g., spread-spectrum modulation), frequency division multiplexing, and/or some other mechanism.

The forward link, for example, may define various sub-channels including (i) a pilot channel on which the RAN may broadcast a pilot signal to allow WCDs to detect wireless coverage, (ii) system parameter channels (e.g., an overhead channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs during a communication session. And the reverse link, for example, may define various sub-channels including (i) access channels on which WCDs may transmit "access attempts" such as registration messages and/or call origination requests, and (ii) traffic channels on which WCDs may transmit bearer traffic for receipt by the RAN during a communication session.

2. Example Network Device

Figure 2:
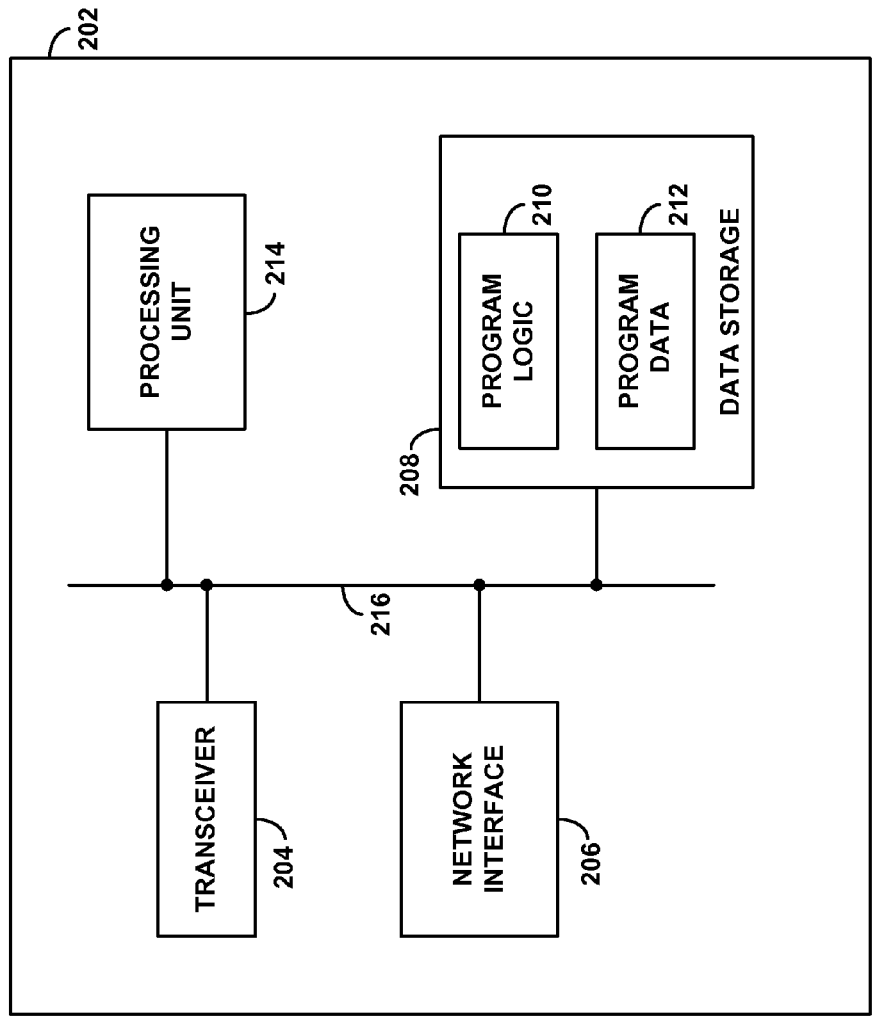
FIG. 2 depicts an example network device arranged to implement the present method.

Those skilled in the art will appreciate that there can be numerous specific implementations of a network device that may be used in connection with at least one embodiment of the method described herein. By way of example, FIG. 2 is a simplified block diagram depicting functional components of an example network device 202 that may be arranged to carry out network-side functions described herein.

The example network device 202 may be representative of BTS 22/24, BSC 26, switch/gateway 28, BSC 26 integrated with BTS 22/24, or some other entity associated with transport network 20 in FIG. 1, for instance. As shown in FIG. 2, network device 202 includes a transceiver 204, a network interface 206, a processing unit 214, and data storage 208, all of which may be coupled together by a system bus 216 or other mechanism. In addition, the network device may also include external storage, such as magnetic or optical disk storage, although this is not shown in FIG. 2.

These components may be arranged to support conventional operation of BTS 22/24, BSC 26, or switch/gateway 28 in a wireless-communication network, such as RAN 12 illustrated in FIG. 1. The details of such an arrangement and how these components function to provide conventional operation are well-known in the art and are not described further herein. Certain aspects of network device 202 relevant to the functions discussed herein are discussed briefly below.

Transceiver 204 may include one or more antennas that radiate to define a coverage area (e.g., coverage area 16) in which network device 202 operates. Transceiver 204 in combination with network interface 206 may enable network device 202 to communicate with WCDs (or perhaps other network devices) on a network, such as RAN 12. For example, network interface 206 in combination with transceiver 204 may enable network device 202 to transmit forward-link communications to WCDs, and receive reverse-link communication from WCDs. Accordingly, network interface 206 may take the form of trunk or optical link that can be coupled with switch/gateway 22, or any Ethernet network interface card or other physical connection that can be coupled with any other entity on the RAN 12 or transport network 24. By way of example, the interface 206 may include a module, such as an CSM™-series chipset made by Qualcomm Inc. of San Diego, Calif., and may support wireless packet-data communications according to a CDMA family of protocols.

Processing unit 214 comprises one or more general-purpose processors (e.g., INTEL microprocessors) and/or one or more special-purpose processors (e.g., dedicated digital signal processor, application-specific integrated circuit, etc.). In turn, the data storage 208 comprises one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein.

3. Example WCD

Figure 3:
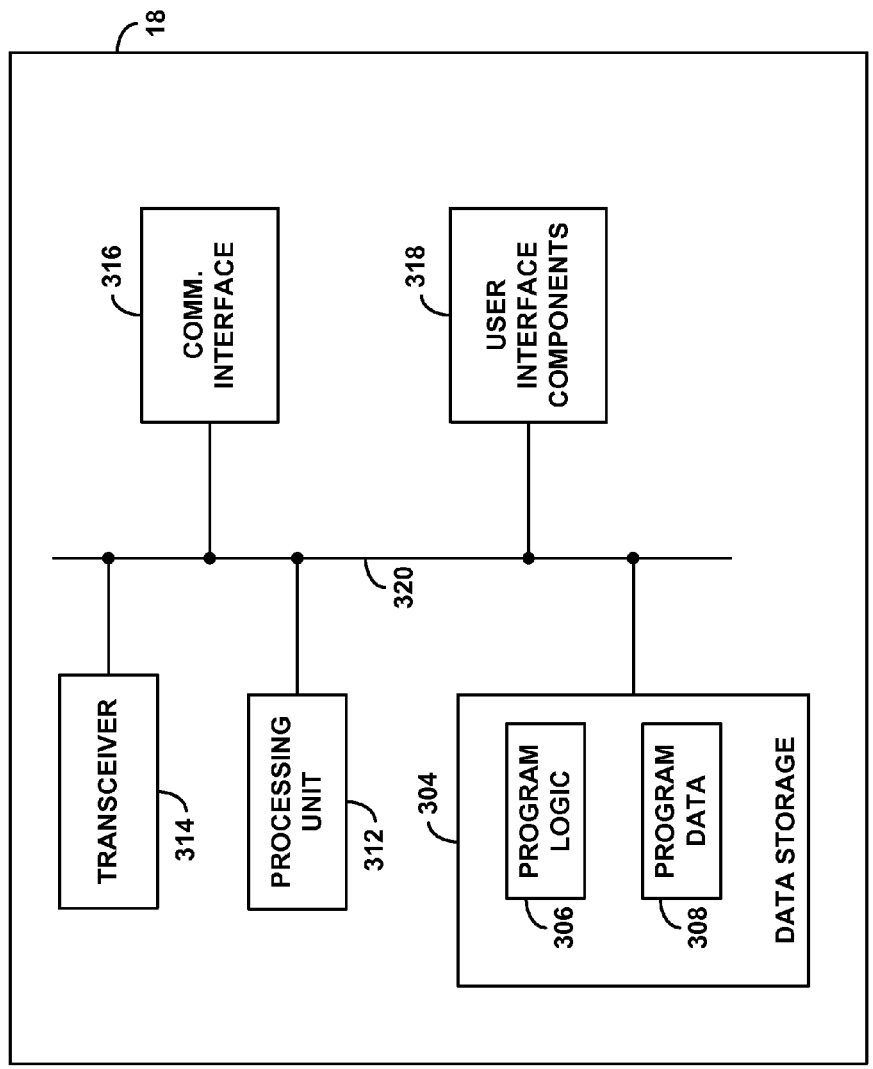
FIG. 3 depicts an example wireless communication device (WCD) arranged to implement the present method.

Those skilled in the art will appreciate that there can be numerous specific implementations of a WCD that may be arranged to carry out at least one embodiment of the method described herein. By way of example, FIG. 3 is a simplified block diagram depicting functional components of an example WCD 18 that may be arranged to carry out at least one embodiment of the method described herein.

The example WCD 18 could be or include a cell phone, a personal digital assistant (PDA), a pager, a wired or wirelessly-equipped notebook computer, and/or any other sort of device. As shown in FIG. 3, the example WCD 18 includes data storage 304, processing unit 312, transceiver 314, communication interface 316, and user-interface components 318, all of which may be coupled together by a system bus 324 or other mechanism.

These components may be arranged to support operation of the WCD 18 in a wireless-communication network, such as RAN 12 illustrated in FIG. 1. For example, transceiver 314 may include one or more antennas arranged to send and receive wireless communication data. Communication interface 316 in combination with transceiver 314 may enable communication with a network device (e.g., network device 202). Such communication may include the reception of data or voice communication from the serving base station and transmission of data or voice to the serving base station. The communication interface 316 may include various wireless-communication specific hardware components, such as an MSM™-series chipset made by Qualcomm Inc. of San Diego, Calif. Communication interface 316 may support one or more wireless packet-data communication protocols.

Processing unit 312 may comprise one or more general-purpose processors (e.g., INTEL microprocessors) and/or one or more special-purpose processors (e.g., dedicated digital signal processor, application specific integrated circuit, etc.). In some arrangements, processing unit 312 may be an MSMT™-series chipset, and thus may be part of communication interface 316.

Data storage 304 comprises one or more volatile and/or non-volatile storage components, such as magnetic or optical memory or disk storage. Data storage 304 can be integrated in whole or in part with processing unit 312, as cache memory or registers for instance. In example WCD 18, as shown, data storage 304 is configured to hold program logic 306 and program data 308.

Program logic 306 may comprise machine-language instructions that define routines executable by processing unit 312 to carry out at least one embodiment of the method as described herein.

4. Example Coverage Area

Figure 4:
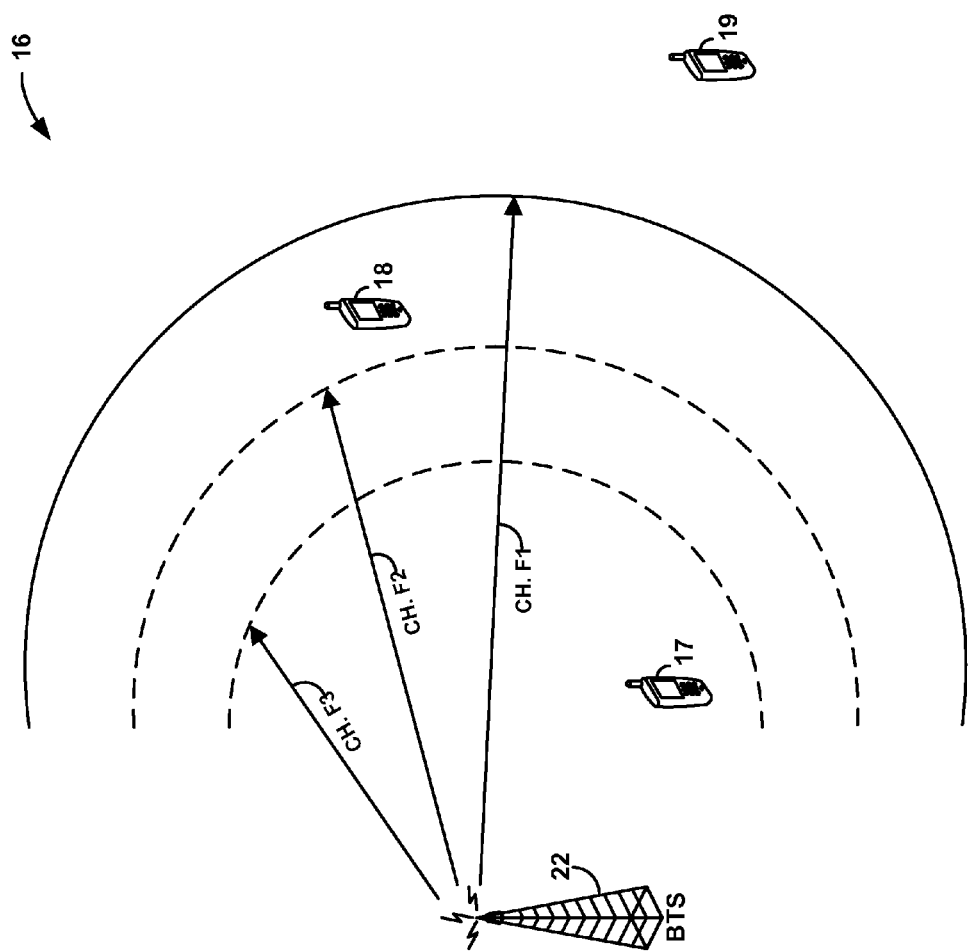
FIG. 4 depicts an example coverage area in which the present method can be implemented.

FIG. 4 illustrates an example serving BTS 22 radiating to define coverage area 16. As shown in FIG. 4, by way of example, coverage area 16 is configured to operate on channels F1, F2, and F3.

As noted above, providing multiple channels in a coverage area may be beneficial. Additional channels may increase the resources available in a coverage area. Typically, if a coverage area tends to be heavily loaded, a service provider may configure that coverage area to implement one or more channels in addition to that coverage area's base operating channel in an effort to increase capacity of the coverage area. Adding a channel to a coverage area can increase capacity of the coverage area by adding the set of resources that each channel provides. For instance, in each coverage area, respective air-interface sub-channels may be encoded using coding resources, such as "Walsh Codes" or other spreading codes, for instance. If, for example, each channel supports a set of 64 Walsh codes, then adding another channel may add 64 more Walsh codes and thus allow possibly 64 additional air-interface communications in the coverage area.

FIG. 4 illustrates each channel having different ranges within which they are accessible to WCDs. For example, channel F1 is shown as extending to the farthest edge of coverage area 16, effectively defining the border of the coverage area. Channel F2 is shown as extending a somewhat shorter distance, and channel F3 is shown as extending a still shorter distance. In practice, the actual extent of coverage provided on each of these channels will not be as discrete as shown in the figure. For instance, coverage provided by a given channel will likely fade out over a distance. The arrow shown in FIG. 4 respectively for each channel might represent how far typically-adequate coverage of the carrier extends from the BTS. Although less adequate or inadequate coverage on the channel might actually extend somewhat beyond the arrowhead. Further, the arc of coverage defined by the coverage area and by coverage provided on each channel is not likely to be as even as shown in the figure, as it will vary based on air interface obstructions and because of other signal propagation issues.

FIG. 4 also illustrates various WCDs operating within coverage area 16. In particular, WCD 17 is shown as existing within coverage of all three channels, F1, F2, and F3. As such, WCD 17 may be able to communicate with the BTS on any of the three channels. WCD 18 is shown as existing within coverage of channel F1 but outside coverage of channels F2 and F3. As such, WCD 18 may be able to communicate with BTS 22 on channel F1, but may not be able to communicate with BTS 22 on channels F2 or F3. And WCD 19 is shown as existing outside coverage of channels F1, F2, and F3. As such, WCD 19 may not be able to communicate with BTS 22 on any of channels F1, F2, or F3.

Different channels in the same coverage area may extend to different distances for various reasons. One reason may be that different carrier frequencies often have different propagation characteristics and thus, some frequencies are more susceptible to attenuation by large objects (e.g., buildings or trees) than other frequencies. For instance, channel F1 in FIG. 4 may be an 800 MHz channel, which tends to propagate relatively easily through certain air-interface obstructions such as concrete. Channel F2 in FIG. 4 may be a 1.9 GHz channel, which may have more difficulty propagating through obstructions. And channel F3 may be a 2.4 GHz channel, which may have still more difficulty propagating through obstructions.

Another reason that different channels may extend to different distances may be that at any given time, different channels may have different congestion levels. In practice, a channel that is heavily congested may extend a shorter range than a channel that is lightly congested. This may be a result of the BTS having a static amount of power it can allocate to WCDs that operate on a given channel. For instance, if the BTS has, say, 10 Watts of power to allocate among 10 WCDs operating on the given channel, each WCD could theoretically be allocated an average of 1 Watt. However, if there are 50 WCDs operating on the given channel, each WCD could theoretically be allocated an average of just 0.2 Watts. The amount of power allocated to a given WCD may determine the distance at which that WCD can communicate with the serving BTS. For instance, a signal transmitted at 1 Watt may propagate a farther distance than a signal transmitted at 0.2 Watts. By way of example, channel F1 in FIG. 4 may be less congested that either of channels F2 or F3. As such, each WCD operating on channel F1 may be allocated more power than WCDs operating on channels F2 or F3. Thus, WCDs operating on channel F1 may be able to communicate with the BTS at farther distances than WCDs communicating on channels F2 or F3. Other reasons for channels extending different distances may also exist as well.

In practice, the RAN (by way of a serving BTS, for example) may periodically broadcast to all WCDs in the coverage area a CLM that specifies the channels available for use in the coverage area. The BTS may broadcast the CLM on each channel of the coverage area and may list in the CLM each available channel in the coverage area. For instance, in coverage area 16, the RAN (e.g., by way of BTS 22) may broadcast a CLM on channels F1, F2, and F3, and the CLM may list channels F1, F2, and F3. Thus, a WCD under the coverage of coverage area 16, such as WCD 18, may receive the CLM, determine that channels F1, F2 and F3 are the channels of the coverage area, and proceed to register for service on F1, F2, or F3.

As noted above, when a WCD is located in a given coverage area and receives a CLM indicating that more than one channel is available in the given coverage area, that WCD may execute a hashing algorithm (or other channel selection process) in order to determine which channel listed in the received CLM to use. By way of example, the well-known SHA-1 algorithm could be used as the hashing algorithm. Other algorithms or hashing techniques, now known or later developed, may be possible as well.

One example of hashing includes a WCD providing an input key to the algorithm and receiving as an output of the algorithm an index value. The index value may correspond to the order of the listed channels and indicate to the WCD which of the listed channels to operate on (e.g., an index value of "0" may refer to the first listed channel, an index value of "1" may refer to the second listed channel, etc.) The input key may take the form of an identifier associated with the WCD (e.g., an International Mobile Subscriber Identity Number (IMSI), or Mobile Identification Number (MIN)). Other examples of hashing are certainly possible as well.

5. Example Operation

Figure 5:
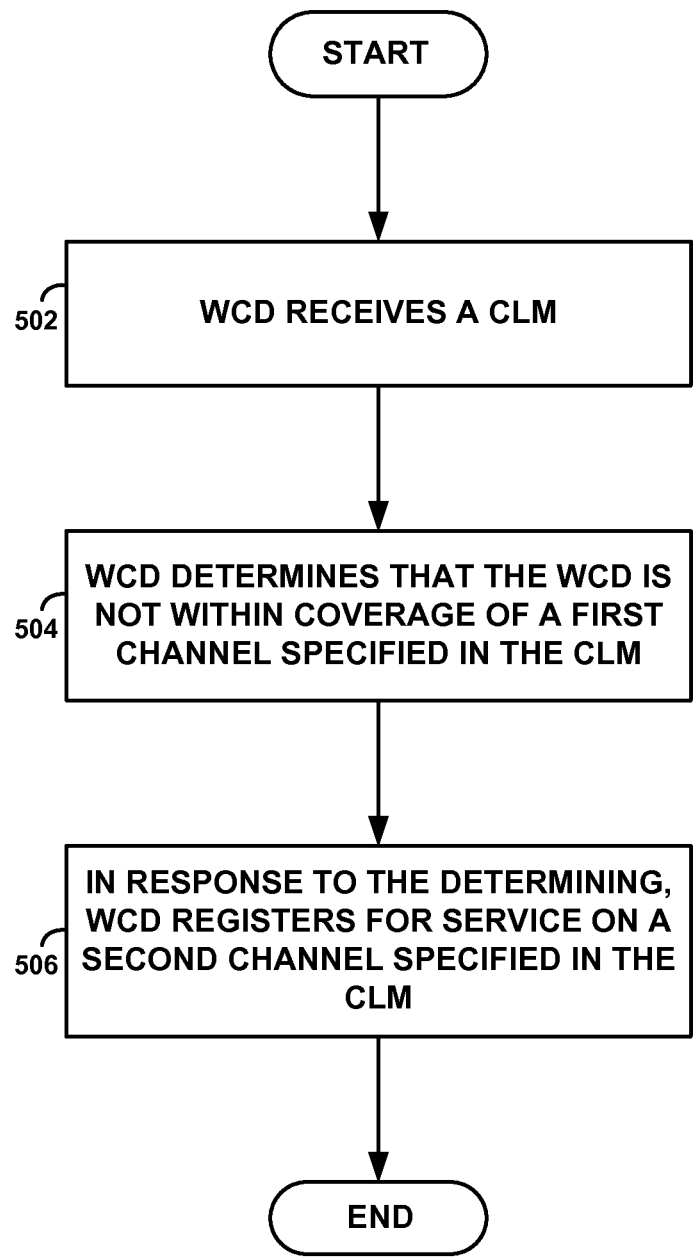
FIG. 5 is a flowchart depicting functions that can be carried out in accordance with the present method.
Figure 6:
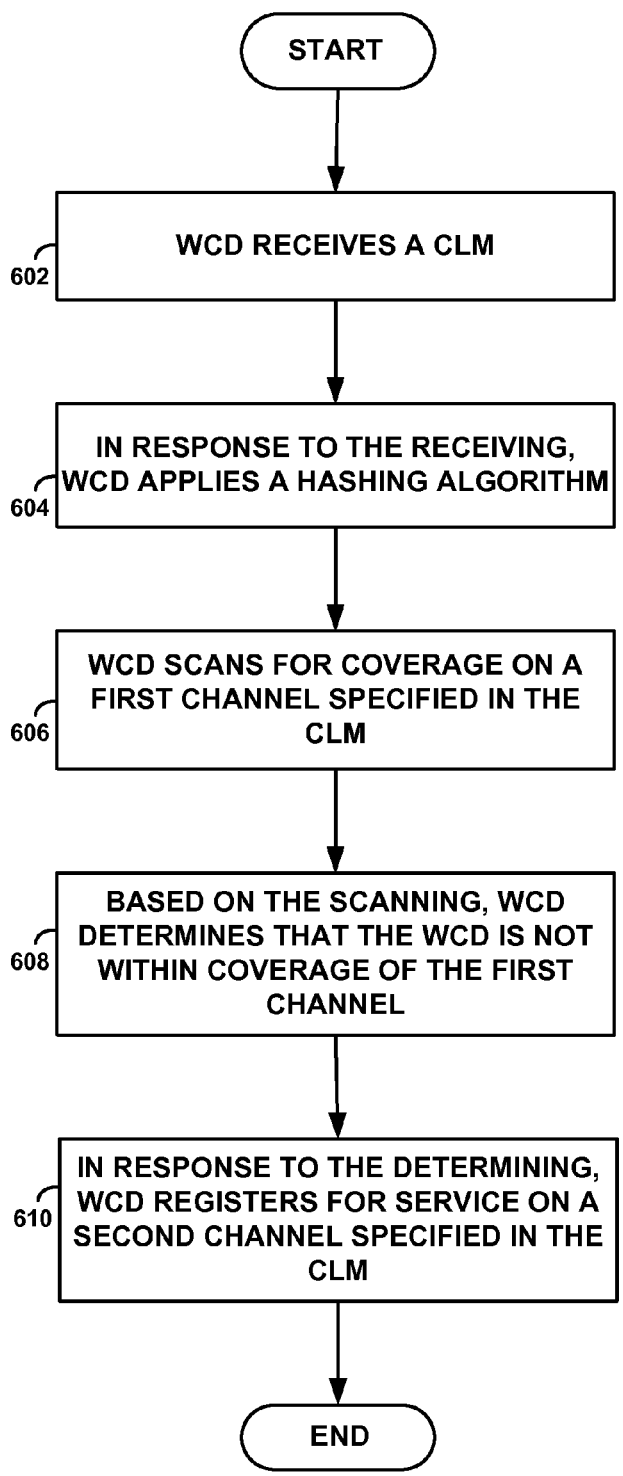
FIG. 6 is another flowchart depicting functions that can be carried out in accordance with the present method.

As discussed above, one reason that a WCD may fail to register for service in a given coverage area is that the WCD may be outside the footprint of the channel on which the WCD is attempting to register. For example, WCD 18 may enter into coverage area 16 and receive a CLM from BTS 22 on channel F1. The CLM may specify channels F1, F2, and F3 as channels that BTS 22 operates on in the given coverage area. In response to receiving the CLM, WCD 18 may apply a hashing algorithm and identify channel F3 as the WCD's hashed channel. If WCD 18 is outside the coverage of channel F3, which is shown by way of example in FIG. 4, then BTS 22 may not receive any registration attempt transmitted by WCD 18 on the hashed channel (i.e., channel F3). As such, WCD 18 may fail to register for service on the hashed channel. FIG. 5 and FIG. 6 depict functions carried out by a WCD in order to manage this registration failure.

FIG. 5 is a flowchart depicting functions that can be carried out by a WCD in accordance with at least one embodiment of the method. As shown in FIG. 5, the flowchart begins at step 502, where the WCD receives a CLM in a given coverage area. For example, WCD 18 may receive a CLM in coverage area 16. As mentioned above, the CLM may be broadcast on an overhead channel by the BTS that defines coverage area 16 (e.g., BTS 22). This CLM may indicate that coverage area 16 provides service on channels F1, F2, and F3. The WCD may receive the CLM on any of the channels on which the given coverage area (and thus the serving BTS) operates.

At step 504, the WCD determines that the WCD is not within coverage of a first channel specified in the received CLM. For example, WCD 18 may determine that it is not within coverage of channel F1. In at least one embodiment of the method, the WCD determines that it is not within coverage of a first channel specified in the received CLM by scanning for coverage of the first channel. If the WCD does not detect a signal on the first channel (e.g., detects an absence of a signal on the first channel), the WCD may determine that it is not within coverage of the first channel. In some embodiments of the method, the WCD may scan for coverage of each channel listed in the received CLM in order to determine which channels cover the WCD's location and which channels do not cover the WCD's location.

In some embodiments of the method, the WCD may determine that it is not within coverage of the first channel before attempting to register for service on the first channel. However, in other embodiments of the method, the WCD may determine that it is not within coverage of the first channel by attempting and failing to register for service on the first channel. For example, the WCD may determine that it has failed to register for service based on the WCD not receiving a message (e.g., a registration response message) from the serving BTS. Other ways for a WCD to determine that it is not within coverage of a first channel or that it has failed to register for service on the first channel are certainly possible as well.

At step 506, in response to the WCD determining that the WCD is not within coverage of the first channel, the WCD may register for service on a second channel specified in the received CLM. In response to registering for service on the second channel, the WCD may idle on the second channel. If there is more than one other channel specified in the received CLM (which would be the case if the CLM specified three or more total channels), the WCD may choose a channel at random from among the two or more remaining channels and register for service on the random channel. Alternatively, the WCD may remove the first channel from the CLM and apply a hashing algorithm to the remaining channels in order to determine a new hashed channel. The WCD may then register for service on the new hashed channel. Other ways of choosing from among the remaining channels may be possible as well.

In some embodiments of the method, after determining that the WCD is not within coverage of the first channel, the WCD may transmit to the serving BTS on another channel a message indicating that the WCD is not within coverage of the first channel. This message may allow the serving BTS to take steps to increase the footprint of the first channel. Such steps may include reallocating the distribution of forward-link power allocated to WCDs served by the serving BTS, or causing at least one WCD to switch from operating on the first channel to operating on a different channel.

FIG. 6 is a flowchart depicting additional functions that may be carried out by a WCD in accordance with at least one embodiment of the method. As shown in FIG. 6, the flowchart begins at step 602, where the WCD receives a CLM from a given coverage area. The WCD may receive the CLM in accordance with the description of step 502 above.

At step 604, in response to receiving the CLM, the WCD applies a hashing algorithm and thereby determines a first channel specified in the received CLM as the WCD's hashed channel. The WCD may apply a hashing algorithm according the above-described hashing procedure. For example, WCD 18 may apply a hashing algorithm to a CLM received in coverage 16 and thereby determine channel F3 as the WCD's hashed channel.

At step 606, the WCD scans for coverage on the first channel, and at step 608 the WCD, based on the scanning for coverage on the first channel, determines that the WCD is not within coverage of the first channel. For example, WCD 18 may scan for coverage of channel F3 and determine that it is not within coverage of channel F3. The WCD may determine that it is not within coverage of the first channel in accordance with the description of step 504 above.

At step 610, in response to the WCD determining that the WCD is not within coverage of the first channel, the WCD may register for service on a second channel specified in the received CLM. In response to registering for service on the second channel, the WCD may idle on the second channel. The WCD may select and register for service on a second channel in accordance with the description of step 506 above.

6. Conclusion

Various embodiments have been described above. Those skilled in the art will understand, however, that changes and modifications may be made to these embodiments without departing from the scope of the claims.

The invention claimed is:

1. A method carried out by a wireless communication device (WCD) that is located in a given coverage area operated by a radio access network (RAN), the method comprising:
    the WCD receiving over an air interface from the RAN a channel list message (CLM) that specifies a plurality of channels that the RAN operates on in the given coverage area;
    the WCD scanning for coverage of each specified channel thereby determining which specified channels the WCD is in coverage of and which specified channels the WCD is not in coverage of;
    based on the scanning, the WCD determining that the WCD is not within coverage of a first channel-specified in the CLM;
    the WCD applying a hashing algorithm with respect to the specified channels the WCD is in coverage of thereby identifying a second channel specified in the CLM as the WCD's hashed channel;
    and
    in response to the identifying, the WCD registering for service on the second channel.

2. The method of claim 1, wherein the WCD scanning for coverage of each specified channel:
    the WCD attempting to register for service on the first channel; and
    the WCD failing to register for service on the first channel.

3. The method of claim 1, wherein the WCD receives the CLM on the second channel.

4. The method of claim 1, further comprising in response to the determining, the WCD transmitting to the RAN an indication that the WCD is not within coverage of the first channel.

5. The method of claim 1, further comprising subsequent to registering for service on the second channel, the WCD idling on the second channel.

6. The method of claim 1, wherein each channel of the plurality of channels specified in the CLM is a carrier frequency.

7. A method carried out by a wireless communication device (WCD) that is located in a given coverage area operated by a radio access network (RAN), the method comprising:
    the WCD receiving over an air interface from the RAN a channel list message (CLM) that specifies a plurality of channels that the RAN operates on in the given coverage area;
    the WCD scanning for coverage of each specified channel thereby determining which specified channels the WCD is in coverage of and which specified channels the WCD is not in coverage of;
    based on the scanning, the WCD determining that the WCD is not within coverage of a first channel specified in the CLM, wherein the WCD determining that the WCD is not within coverage of a first channel specified in the CLM comprises:
    the WCD detecting an absence of a signal on the first channel;
    the WCD applying a hashing algorithm with respect to the specified channels the WCD is in coverage of thereby identifying a second channel specified in the CLM as the WCD's hashed channel and in response to the identifying, the WCD registering for service on a second channel specified in the CLM.

8. The method of claim 7, wherein the WCD receives the CLM on the second channel.

9. The method of claim 7, further comprising in response to the determining, the WCD transmitting to the RAN an indication that the WCD is not within coverage of the first channel.

10. The method of claim 7, further comprising subsequent to registering for service on the second channel, the WCD idling on the second channel.

11. The method of claim 7, wherein each channel of the plurality of channels specified in the CLM is a carrier frequency.

12. A method carried out by a wireless communication device (WCD) that is located in a given coverage area operated by a radio access network (RAN), the method comprising:
    the WCD receiving over the air interface from the RAN a channel list message (CLM) that specifies a plurality of channels that the RAN operates on in the given coverage area;
    the WCD scanning for coverage of each specified channel thereby determining which specified channels the WCD is in coverage of and which specified channels the WCD is not in coverage of;
    based on the scanning, the WCD applying a hashing algorithm with respect to the specified channels the WCD is in coverage of thereby identifying a first channel of the plurality of channels as the WCD's hashed channel;
the WCD scanning for coverage on the first channel;
in response to the scanning, the WCD determining that the WCD is not within coverage of the first channel; and
in response to the determining, the WCD registering for service on a second channel specified in the CLM.

13. The method of claim 12, wherein the WCD receives the CLM on the second channel.

14. The method of claim 12, further comprising:
in response to the determining, the WCD transmitting to the RAN an indication that the WCD is not within coverage of the first channel.

15. The method of claim 12, wherein each channel of the plurality of channels specified in the CLM is a carrier frequency.

16. A wireless communication device (WCD) configured for being served over an air interface in a given coverage area by a radio access network (RAN), the WCD comprising:
a wireless-communication interface;
a processor; and
data storage containing instructions executable by the processor for carrying out functions, the functions including:
the WCD receiving over the air interface from the RAN a channel list message (CLM) that specifies a plurality of channels that the RAN operates on in the given coverage area;
the WCD scanning for coverage of each specified channel thereby determining which specified channels the WCD is in coverage of and which specified channels the WCD is not in coverage of;
the WCD applying a hashing algorithm thereby identifying a first channel specified in the CLM as the WCD's hashed channel;
based on the scanning, the WCD determining that the WCD is not within coverage of the first channel; and
in response to the determining, the WCD registering for service on a second channel specified in the CLM.

17. The WCD of claim 16, wherein the WCD determining that the WCD is not within coverage of a first channel specified in the CLM comprises:
the WCD attempting to register for service on the first channel; and
the WCD failing to register for service on the first channel.

18. The WCD of claim 16, wherein the WCD receives the CLM on the second channel.

19. The WCD of claim 16, wherein the functions further comprise:
in response to the determining, the WCD transmitting to the RAN an indication that the WCD is not within coverage of the first channel.

20. The WCD of claim 16, wherein the functions further comprise:
subsequent to registering for service on the second channel, the WCD idling on the second channel.

21. The WCD of claim 16, wherein each channel of the plurality of channels specified in the CLM is a carrier frequency.

22. A wireless communication device (WCD) configured for being served over an air interface in a given coverage area by a radio access network (RAN), the WCD comprising:
a wireless-communication interface;
a processor; and
data storage containing instructions executable by the processor for carrying out functions, the functions including:
the WCD receiving over the air interface from the RAN a channel list message (CLM) that specifies a plurality of channels that the RAN operates on in the given coverage area;
the WCD scanning for coverage of each specified channel thereby determining which specified channels the WCD is in coverage of and which specified channels the WCD is not in coverage of;
based on the scanning, the WCD determining that the WCD is not within coverage of a first channel specified in the CLM, wherein the WCD determining that the WCD is not within coverage of a first channel specified in the CLM comprises:
the WCD detecting an absence of a signal on the first channel;
the WCD applying a hashing algorithm with respect to the specified channels the WCD is in coverage of thereby identifying a second channel specified in the CLM as the WCD's hashed channel; and in response to the identifying, the WCD registering for service on a second channel specified in the CLM.

23. The WCD of claim 22, wherein the WCD receives the CLM on the second channel.

24. The WCD of claim 22, wherein the functions further comprise:
in response to the determining, the WCD transmitting to the RAN an indication that the WCD is not within coverage of the first channel.

25. The WCD of claim 22, wherein the functions further comprise:
subsequent to registering for service on the second channel, the WCD idling on the second channel.

26. The WCD of claim 22, wherein each channel of the plurality of channels specified in the CLM is a carrier frequency.

* * * * *